United States Patent [19]

Kweon

[11] Patent Number: 5,424,939
[45] Date of Patent: Jun. 13, 1995

[54] AUTOMATIC WATER INJECTOR FOR WET MOP CLEANER AND WATER INJECTION METHOD THEREOF

[75] Inventor: Sun-don Kweon, Seoul, Rep. of Korea

[73] Assignee: Samsung Electronics Co., Ltd., Kyungki-Do, Rep. of Korea

[21] Appl. No.: 220,027

[22] Filed: Mar. 30, 1994

[30] Foreign Application Priority Data

Mar. 31, 1993 [KR] Rep. of Korea ............... 93-5206

[51] Int. Cl.⁶ ............................................. G05B 13/00
[52] U.S. Cl. ............................... 364/130; 134/56 R; 134/113; 356/435
[58] Field of Search ............... 364/130, 148; 68/12.27, 68/12.02, 12.04, 12.21, 12.16, 12.05; 134/113, 56 R, 57 R, 58 R; 250/564, 565; 356/432–436; 340/619

[56] References Cited

U.S. PATENT DOCUMENTS 5,134,867 8/1992 Kiuchi et al. ............... 68/12.02
5,241,845 9/1993 Ishibashi et al. ............... 68/12.02

Primary Examiner—James P. Trammell
Attorney, Agent, or Firm—Sughrue, Mion, Zinn, Macpeak & Seas

[57] ABSTRACT

An automatic water injector for a wet mop cleaner and an operation method thereof which detects the soil level of a mop so as to automatically inject washing water thereto, wherein the water injector has a soil level detector for detecting the soil level of the mop, a controller for controlling the water injection depending on the detected soil level, a water absorber operated under the control of the controller and a water injector operated under the control of the controller. The method includes driving the mop in accordance with a user input, determining if the mop needs to be washed by detecting the soil level of the mop and comparing the detected level with a predetermined standard level, washing the mop if the comparison determines the need for washing the mop and stopping the mop operation according to stop key input. Accordingly, a proper quantity of water corresponding to the soil level of the mop is automatically injected, to thereby provide convenience to users.

14 Claims, 5 Drawing Sheets

AUTOMATIC WATER INJECTOR FOR WET MOP CLEANER AND WATER INJECTION METHOD THEREOF

BACKGROUND OF THE INVENTION

1. Field of the Invention

The present invention relates to a wet mop cleaner, and more particularly, to an automatic water injector of a wet mop cleaner and a water injection method thereof which can detect the soil level of a mop and automatically inject a suitable amount of water depending on the soil level.

Korean Patent Application No. 93-5206 is incorporated herein by reference for all purposes.

2. Brief Description of the Related Art

Conventionally, when a user wants to wash a mop during a wet mopping operation, the user has to stop mopping momentarily and confirm the soil level of the mop visually. Then, the user has to decide whether to inject water and the amount of water to be injected as well. Then, the water can be injected by pushing a water injection button.

A water injection method for the conventional wet mop will be explained with reference to FIG. 1.

A user operates the wet mop driving key so as to drive the wet mop (step 10). The wet mop is driven in accordance with the driving key operation (step 11). During the operation of the wet mop, the user recognizes the soil of the mop and operates a wet mop washing key in order to wash the wet mop (step 12). The operation of the wet mop is stopped when the wet mop washing key is operated (step 13). Water is absorbed when the operation of the wet mop is stopped (step 14). Water is injected in order to wash the mop after the water is absorbed (step 15). At this time, if the user wants to wash the mop once again, the operations of steps 12 to 15 have to be repeated. A wet mop re-driving key is operated to complete the washing (step 16). The wet mop is re-driven when the wet mop re-driving key is operated (step 17). The user operates a wet mop stop key when the cleaning is finished (step 18). The operation of the wet mop is stopped when the wet mop stop key is operated (step 19).

In a conventional water injection method for a wet mop, the soil level of the mop is recognized visually and wet mop stopping and water injection steps are performed by operating each key. Accordingly, if the user is not accustomed to the device, water injection timing and amount can not be appropriately controlled, which is very inconvenient.

SUMMARY OF THE INVENTION

Accordingly, it is an object of the present invention to provide a wet mop water injector that estimates the soil level of the mop by employing an infrared ray sensor and automatically injects a suitable amount of water in accordance with the soil level.

Another object of the present invention is to provide a wet mop water injection method that estimates the soil level of the mop by employing an infrared ray sensor and automatically injects a suitable amount of water in accordance with the soil level.

Still another object of the present invention is to provide a wet mop water injection method that estimates the overall soil level by calculating the average value of the soil level of each part of the mop by employing a plurality of infrared ray sensors and that automatically injects a suitable amount of water.

To accomplish one object of the present invention, there is provided an automatic water injector of a wet mop cleaner comprising: a soil level detector for detecting a soil level of a mop, a controller for controlling the water injection according to the detected soil level, a water absorption means driven by the controller, and a water injection means driven by the controller.

To accomplish another object of the present invention, there is provided, an automatic water injection method of a wet mop cleaner having a soil level detector for detecting the soil level of the mop, a controller for controlling the water injection according to the detected soil level, a water absorption means driven by the controller and a water injection means driven by the controller. The method comprises a mop driving step for driving a mop according to a driving key input, a step for detecting the soil level of the mop and comparing the detected level with a predetermined standard level for determining whether or not the mop needs to be washed, a mop washing step for washing the mop if the mop needs to be washed, and a step for stopping the operation of the mop in accordance with a driving stop key input.

To accomplish still another object of the present invention, there is provided an automatic water injection method for a wet mop cleaner having a soil level detecting means for detecting the soil level of the mop, a controller for controlling the water injection according to the detected soil level, a water absorption means driven by the controller and a water injection means driven by the controller. A method comprises a mop driving step for driving a mop according to a driving key input, a step for detecting a multitude of soil levels of the mop so as to establish an average level and comparing the average level with a predetermined standard level for determining whether or not the mop needs to be washed, a step for washing the mop if it is determined the mop needs to be washed, and a step for stopping the operation of the mop in accordance with a driving stop key input.

DETAILED DESCRIPTION OF THE PREFERRED EMBODIMENTS

The present invention will be explained in more detail with reference to the attached drawings.

Figure 1:
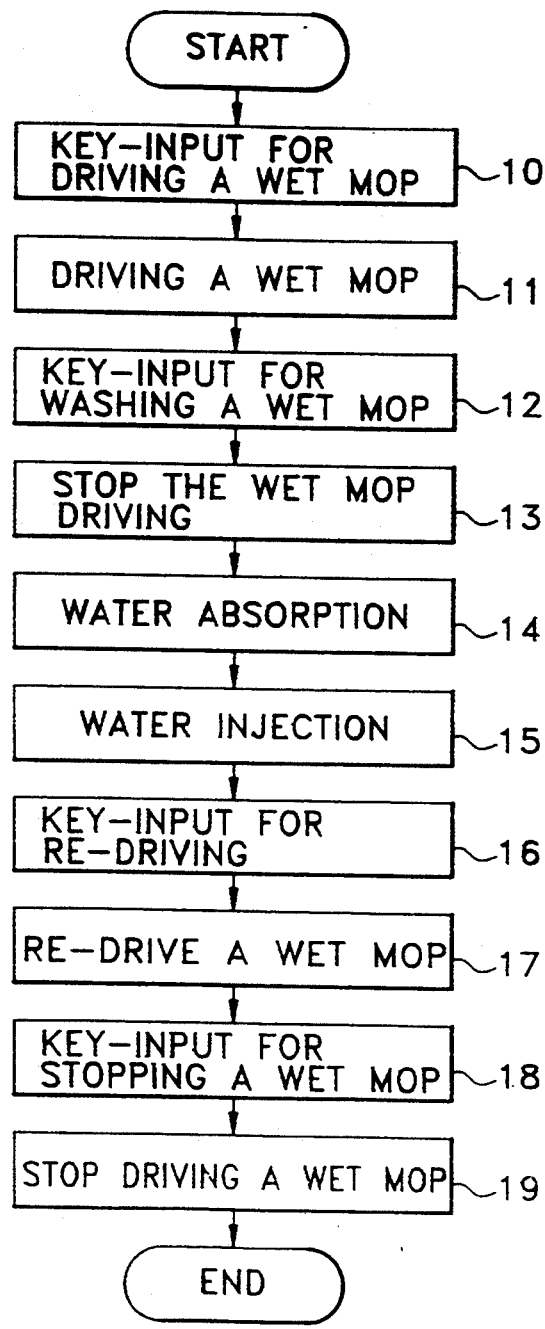
FIG. 1 is a flowchart illustrating a water injection method for a conventional water mop cleaner.
Figure 2:
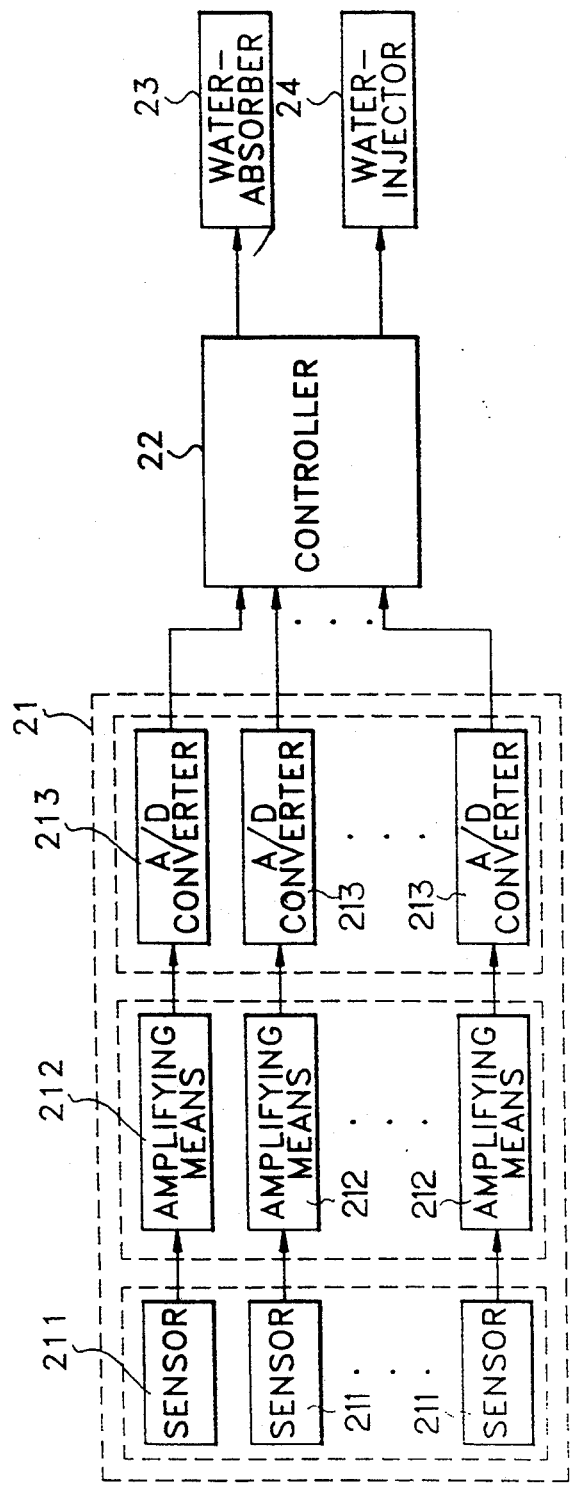
FIG. 2 is a block diagram showing an automatic water injector for a wet mop cleaner according to the present invention.

Referring to FIG. 2, the automatic water injector for a wet mop cleaner includes a soil level detector 21 for detecting the soil level of a mop, a controller 22 for controlling water injection according to the detected soil level, a water absorber 23 operated under the control of controller 22 and a water injector 24 operated under the control of controller 22.

Soil level detecting means 21 includes a plurality of sensing units, each comprising a sensor 211 for detecting the soil level of a mop by employing infrared rays, an amplifier 212 for amplifying the detection signal output by sensor 211 and an analog/digital converter 213 for converting the amplified analog detection signal into a digital signal. One or more of such sensing units may be employed, or a multitude of such units can be used depending on the desired precision level of the soil level estimation.

Figure 3:
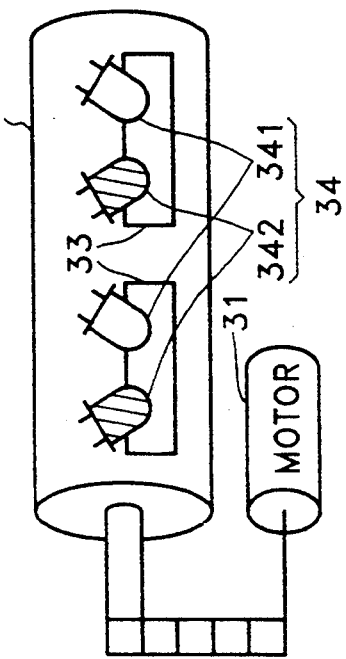
FIG. 3 shows a sensor of an automatic water injector of a wet mop cleaner according to the present invention.

Referring to FIG. 3, a sensor 34, corresponding to a sensor 211 of FIG. 2, having a transparent window 33 is installed near a wet mop 32 which is rotated by a rotary motor 31,.and includes infrared ray (IR) diodes 341 for irradiating infrared rays through the transparent window 33 onto wet mop 32 and light receiving diodes 342 for receiving infrared rays which are reflected from mop 32.

The degree of soiling of the mop is determined by using the fact that the signal detected by a sensor 211 changes in accordance with the color which lightens when a mop is soiled by substances having a light color, for example, dust, and with the color darkened when a mop is soiled by substances having a dark color, for example, ink.

When a wet mop starts operating, controller 22 causes irradiation of infrared rays onto the mop by employing infrared ray diode 341 of sensor 34 of soil level detector 21. Light receiving diode 342 receives the infrared rays reflected from the mop. The received signal is amplified by amplifier 212 and the result is output. Analog/digital converter 213 converts the amplified analog signal into a digital signal and the result is output.

In controller 22, the soil level represented by the detected signal level is compared with a predetermined standard level. If the detected soil level is higher than the standard, water absorber 23 is operated so as to absorb water from a water supply source, and water injector 24 injects the water into the mop during a predetermined time period that is in proportion to the detected soil level.

In addition, when a plurality of sensing units is used, controller 22 recognizes a soiled condition when more than half of the soil levels detected by the plurality of sensing units exceeds the standard level. Thus, rotary motor 31 stops operating so that water can be absorbed by water absorber 23. Then, the water is injected by employing water injector 24.

Figure 4:
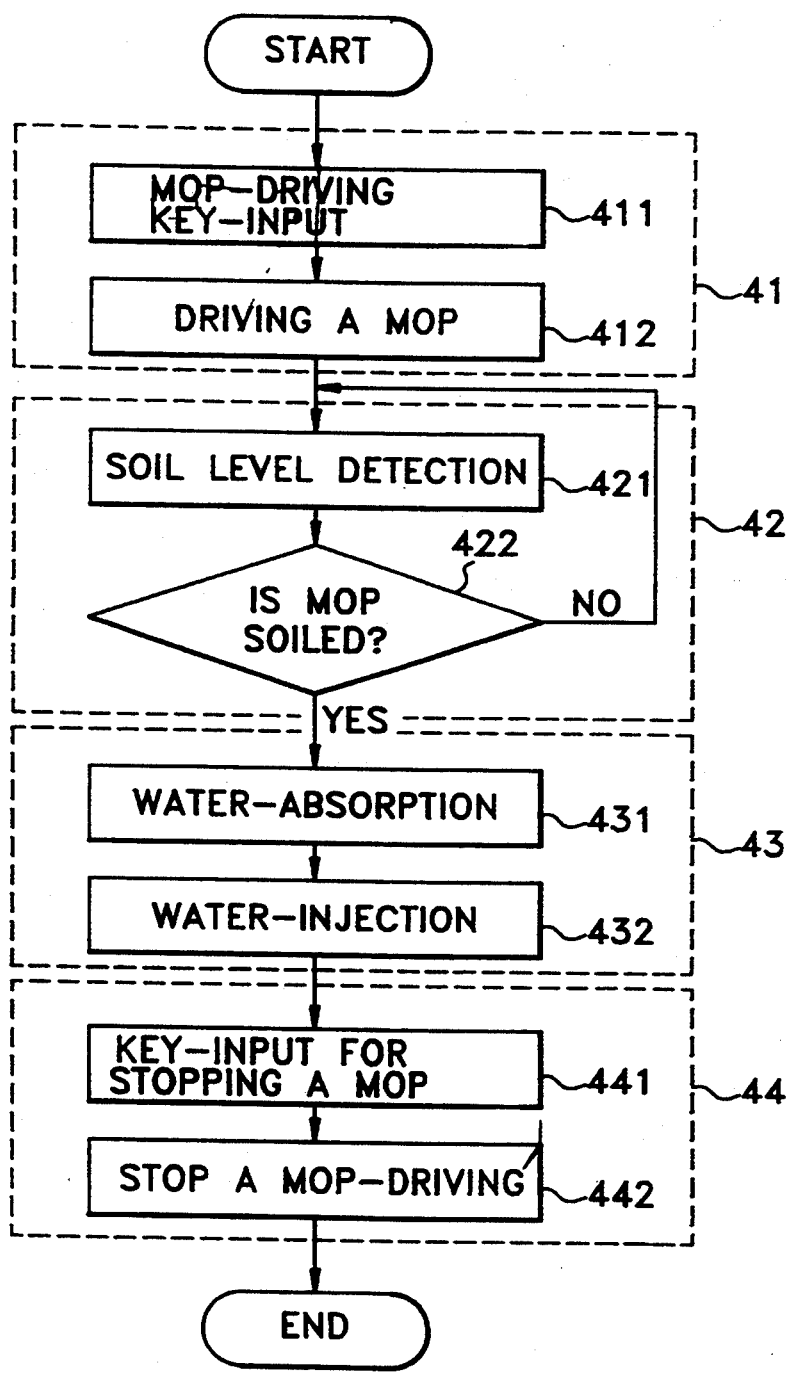
FIG. 4 is a schematic flowchart illustrating an automatic water injection method for a wet mop cleaner according to the present invention.

An automatic water injection method for a wet mop cleaner of the present invention will be explained with reference to FIGS. 2 to 4. A user operates a mop driving key to drive the mop (step 41). A determination is made whether or not the soil level detected by soil level detector 21 is higher than a reference or standard level (step 42). The wet mop is washed if the result is affirmative (step 43). Operation of the wet mop is stopped after the wet mop is washed (step 44).

Step 41 includes a mop driving key input sub-step 411 and a mop driving sub-step 412 for driving wet mop 32 by means of driving motor 31 in accordance with the key input. Step 42 includes a soil level detecting sub-step 421 for detecting the soil level by employing soil level detector 21 during the operation of wet mop 32 and a determination sub-step 422 for comparing the detected soil level with a standard level in order to determine whether or not the wet mop is soiled. Step 43 includes a water absorption sub-step 431 where water absorber 23 absorbs water when wet mop 32 is determined to be soiled and a water injection sub-step 432 where water injector 24 injects the water when water absorption step 431 is completed. Step 44 includes a mop driving stop key input sub-step 441 for inputting a mop driving stop key when wet mop 32 is washed by the water injection and an operation stopping sub-step 442 for stopping the operation of the mop in accordance with the mop operation stop key input.

Figure 5:
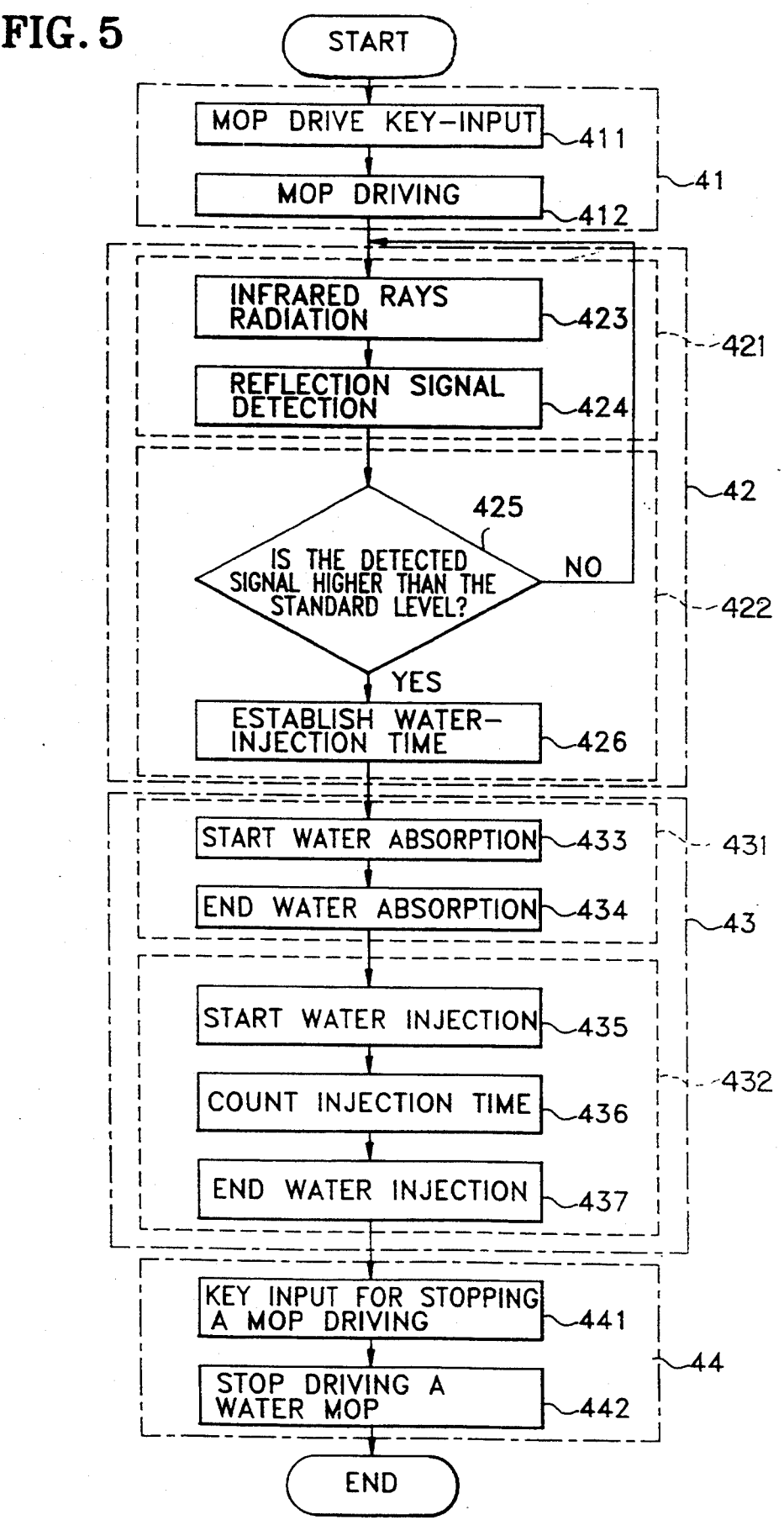
FIG. 5 is a detailed flowchart illustrating an automatic water injection method for a wet mop cleaner according to the present invention.

FIG. 5 is a detailed flowchart of an automatic water injection method of a wet mop cleaner showing further details of the method of FIG. 2, according to an embodiment of the present invention. A soil level detecting step 421 includes an infrared ray radiation sub-step 423 for irradiating infrared rays by infrared diode 341 and a reflection signal detecting sub-step 424 for detecting the signal reflected from the mop by employing light receiving diode 342. Soil level judging step 422 includes a judging sub-step 425 for inputting the detected signal and for judging a soiled condition to exist when the detected signal exceeds the standard level, and a water injection time establishing sub-step 426 for determining the water injection time depending on the detected soil level. Water absorption step 431 includes a water absorption start sub-step 433 where water absorber 23 absorbs water in accordance with the control command when a mop is judged as being soiled and a water absorption ending sub-step 434 for ending the water absorption. Water injection step 432 includes a water injection sub-step 435 where water injector 24 injects water in accordance with a control command, a water injection time counting sub-step 436 for counting the water injection time period predetermined in sub-step 426 simultaneously with the start of the water injection sub-step 435, and a water injection ending sub-step 437 for ending the water injection of water injector 24 when the predetermined time period is counted (elapses).

Figure 6:
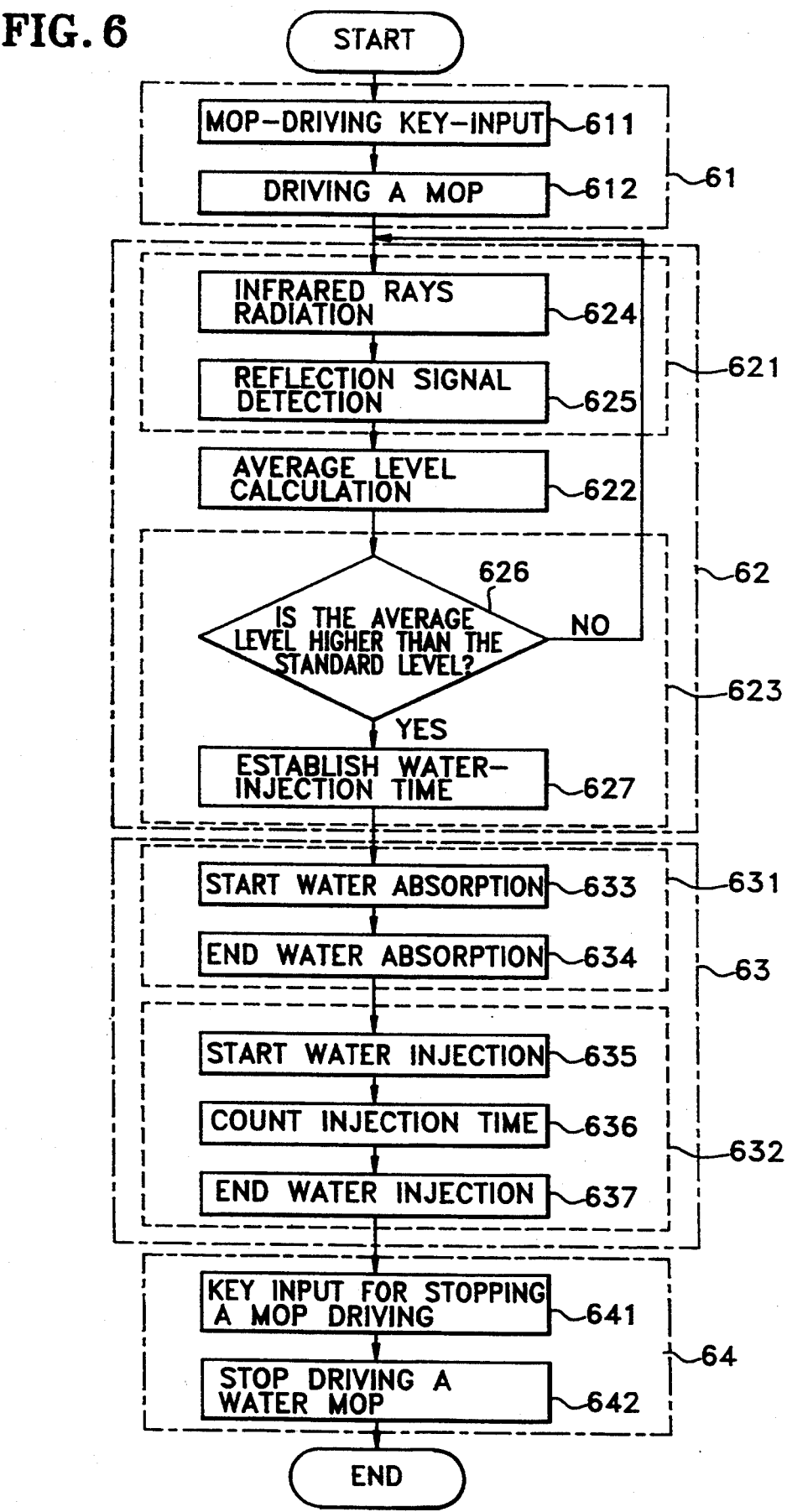
FIG. 6 is a flowchart of the operation method of an automatic water injector having a plurality of soil level detecting sensors of a wet mop cleaner according to the present invention.

FIG. 6 is a flowchart illustrating an automatic water injection method for a water mop which includes a multitude of sensing units.

The method of FIG. 6 differs from the method of FIG. 5, in that the method of FIG. 6 includes an infrared ray irradiation step 624 for irradiating infrared rays onto the mop by employing a multitude of infrared ray diodes 341, a reflection signal detecting step 625 for detecting the reflection signals by employing a multitude of light receiving diodes 342 which detect a multitude of reflection signals reflected from the mop, and an average level calculating step 622 for calculating an average level of the reflected and detected signals.

The method of FIG. 6 will be explained with reference to FIGS. 2 and 3 as follows.

FIG. 6 shows a step 61 for operating the mop, a step 62 for detecting a multitude of soil levels from the mop so as to calculate an average soil level and for comparing the calculated average soil level with a reference or standard level so as to determine whether or not the mop is soiled, a step 63 for washing the mop if the mop is determined to be soiled and a step 64 for stopping the operation of the mop in accordance with the operation stop key-input after the mop is washed.

Step 61 for operating the mop includes a mop operation key input sub-step 611, and an operation sub-step 612 for operating the mop according to the above key-input. Soil level determining step 62 includes a soil level calculating sub-step 621 for calculating a plurality of soil levels corresponding to the signals detected from the plurality of soil level detectors 21, an average soil level calculating sub-step 622 for calculating an average soil level from the plurality of the detected soil levels, and a water injection time establishing sub-step 623 for comparing the calculated average soil level with a standard level so as to establish a water injection time in accordance with the calculated soil level. Soil level calculating sub-step 621 includes an infrared ray irradiation sub-step 624 for irradiating infrared rays by employing a multitude of infrared ray diodes 341 and a reflection signal detecting sub-step 625 for detecting the reflection signals by employing light receiving diodes 342. Water injection time establishing sub-step 623 includes a determination sub-step 626 where controller 22 compares the calculated average soil level with the standard level so as to judge whether and by how much the average soil level exceeds the standard level and a sub-step 627 for establishing a water injection time according to the exceeded degree of soiling. Water absorption step 631 includes a water absorption starting sub-step 633 where water absorber 23 absorbs water and a water absorption ending sub-step 634 where water absorber 23 ends water absorption. Water injection step 632 includes a water injection start sub-step 635 where water injector 24 starts water injection, a water injection time counting sub-step 636 where elapsing of a water injection time period predetermined in sub-step 627 is counted with the start of the water injection and a water injection ending sub-step 637 for making water injector 24 stop the water injection after the water injection time counting period is completed. Wet mop operation stop step 64 includes a sub-step 641 for inputting a wet mop operation stop key and a sub-step 642 for stopping the wet mop operation where the operation of the wet mop is stopped in accordance with the stop key input.

Accordingly, an automatic water injector and method of the present invention enables an estimation of the soil level of a mop by employing an infrared ray sensor and the automatic injection of an appropriate amount of water according to the soil level, to thereby provide convenience to users.

Other modifications and variations to the invention will be apparent to one skilled in the art from the foregoing disclosure and teachings. Thus, while only certain embodiments of the invention have been specifically described herein, it will be apparent that numerous modifications may be made thereto without departing from the spirit and scope of the invention.

What is claimed is:

1. An automatic water injector for a wet mop cleaner, comprising:
   a soil level detector detecting the soil level of a mop;
   a controller responsive to the detected soil level for determining the need for cleaning soil from said mop and for controlling said cleaning operation;
   a water absorption system operable in accordance with the control of said controller to absorb water for use in cleaning said mop; and
   a water injector operable in accordance with the control of said controller to inject water to wash said mop.

2. An automatic water injector for a wet mop cleaner according to claim 1, wherein said soil level detector comprises:
   sensor means for detecting the soil level of said mop by using infrared rays and outputting an analog detection signal corresponding to said soil level;
   amplifying means for amplifying the detection signal from said sensor means; and
   analog/digital converting means for converting said amplified analog detection signal into a digital signal.

3. An automatic water injector for a wet mop cleaner according to claim 2, wherein said sensor means comprises:
   an infrared-transparent window installed proximate said mop;
   an infrared ray diode for irradiating infrared rays through said transparent window onto said mop;
   a light receiving diode for receiving said irradiated infrared rays reflected from said mop.

4. An automatic water injector for a wet mop cleaner according to claim 3, wherein said soil level detector comprises multiple substantially identical sensor means, and wherein said controller includes means for averaging the signals derived from said multiple sensors and comparing said averaged signals to a predetermined reference level of soiling.

5. A wet mop with automatic cleaner, comprising, a wet mop, a sensor positioned adjacent to said wet mop for sensing the soiling level of said mop, and a water injector for injecting water to clean said mop when the sensed soiling level is above a preset reference level of soiling.

6. An automatic water injection method for a wet mop cleaner comprising the steps of:
   driving a wet mop according to a user input;
   automatically sensing the soil level of the mop and comparing the sensed soil level with a predetermined standard level for determining whether or not the mop needs to be washed;
   automatically washing the mop if the sensed soil level exceeds the predetermined standard level.

7. The method of claim 6, wherein the step of automatically sensing the soil level of said mop comprises:
   irradiating infrared rays onto said mop; and
   detecting the irradiated infrared rays reflected by said mop.

8. The method of claim 6 wherein the step of automatically washing comprises:
   determining from said comparison an appropriate water injection time period for injecting water onto said mop; and
   injecting water onto said mop for said appropriate time period.

9. The method of claim 8, wherein the step of automatically washing further comprises:
   absorbing water to be used to inject onto said mop whenever said sensed soil level exceeds said predetermined standard level and prior to the injection of water onto said mop.

10. The method according to claim 9, wherein the step of absorbing water comprises:

starting water absorption; and ending water absorption when the absorbed water reaches a predetermined level.

11. The method according to claim 9, wherein the step of injecting water onto said mop comprises:

starting water injection for injecting the absorbed water when said water absorption ending step is completed;

monitoring the elapsed time period from the start of water injection; and stopping the injection of water when the monitored time period corresponds to the said appropriate time period.

12. An automatic water injection method for a wet mop cleaner according to claim 6, wherein the determination whether the mop needs to be washed is performed by detecting a plurality of soil levels of the mop and wherein the wet mop is determined as being soiled when at least one of said plurality of detected soil levels exceeds the standard level.

13. An automatic water injection method for a wet mop cleaner, comprising the steps of:

driving a wet mop according to a user input;

automatically sensing soil levels of said mop at a plurality of different points on said mop;

establishing an average soil level from said plurality of soil levels;

comparing said average soil level with a predetermined standard level;

automatically washing said mop if said average soil level exceeds said predetermined standard level; and stopping the operation of the mop in accordance with a driving stop key-input.

14. An automatic water injection method for a wet mop cleaner, comprising the steps of:

driving a wet mop according to a user input;

automatically sensing soil levels of said mop at a plurality of different points on said mop;

comparing said sensed soil levels with a predetermined standard level;

automatically washing said mop if at least one of said sensed soil levels exceeds said predetermined standard level; and stopping the operation of the mop in accordance with a driving stop key-input.

* * * * *